Figure 1:
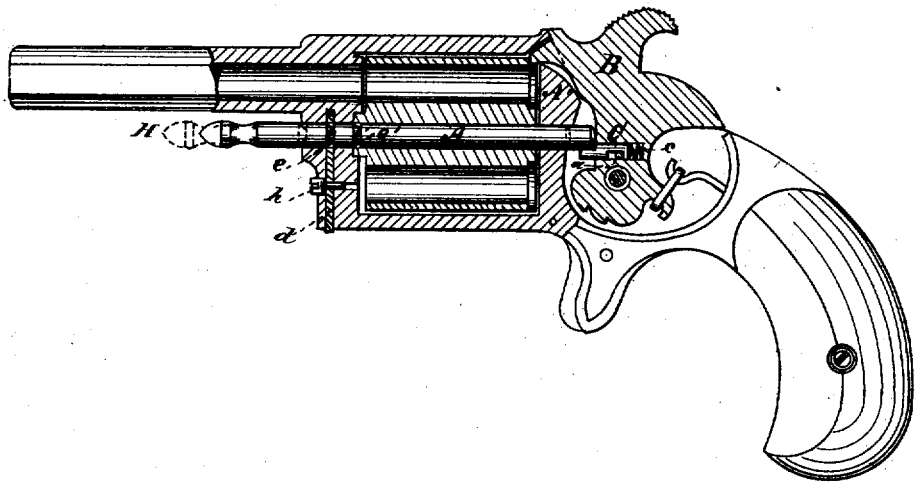

C. W. HOPKINS.

Safety-Catches for Revolvers.

No. 6,715. Reissued Oct. 26, 1875.

*Witnesses:*

Henry Eichling.

B. S. Clark.

*Inventor:*

Charles W. Hopkins

By G. P. Fetch

His Attorney

N. PETERS, PHOTO-LITHOGRAPHER, WASHINGTON, D. C.

UNITED STATES PATENT OFFICE.

CHARLES W. HOPKINS, OF NORWICH, CONNECTICUT, ASSIGNOR OF ONE-HALF INTEREST TO MERWIN, HULBERT & CO.

IMPROVEMENT IN SAFETY-CATCHES FOR REVOLVERS.

Specification forming part of Letters Patent No. 165,098, dated June 29, 1875; reissue No. 6,715, dated October 26, 1875; application filed September 14, 1875.

*To all whom it may concern:*

Be it known that I, CHARLES W. HOPKINS, of Norwich, Connecticut, have invented an Improvement in Fire-Arms, of which the following is a specification, reference being had to the drawing hereto annexed forming part of the same.

My invention consists in a locking device relating to the locking of the hammer of a revolver fire-arm, so that when the device is employed or used the hammer cannot be cocked for firing without first being released from the locking device; and consists of a projection on the lower anterior part of the hammer, so arranged that the axial pin on which the cylinder revolves may be pushed back through the recoil-shield, and made to engage with said projection in the hammer, and thereby, when the hammer is let down onto the rear of the cylinder, lock it in such position.

Figure 1 is a side view of a revolver-pistol containing my devices.

It is deemed unnecessary here to describe the general mechanism, which is common, confining myself chiefly to the description of the particular devices which I claim as new.

A is the axial-pin of the cylinder, extending through the recoil-shield A′. B is the hammer; C, a pin, which I call "locking-pin," placed in a recess in the lower anterior part of the hammer. A pin, *a*, passing through a broad notch in the locking-pin C, holds the latter in place, while it is permitted to move back against a small spiral spring, *c*, at the bottom of the recess, which keeps the said locking-pin C pressed outward. The parts are so arranged that when the hammer is thrown down upon the rear of the cylinder, and the axial pin is forced back, it will come in contact with the anterior edge of the hammer-shaft immediately above the locking-pin, thereby, as is evident, preventing the hammer from being raised and cocked without first pulling forward the axial pin out of engagement with the locking-pin. To hold and detain the axial pin in the two positions indicated, it is provided with two annular notches or recesses, *e e′*, and there is provided a stop-lever, *d*, pivoted in the frame at *h*, a spring underneath it acting to press the upper end into engagement with the said annular notches, the lower end projecting outside of the frame, exposed to the pressure of the finger. When the axial pin is pushed back into engagement with the locking-pin on the hammer the said stop-lever will engage with the notch, *e*, and when it is pulled out of such engagement it will rest in the notch *e′*. To lock the hammer so that it cannot be cocked for firing, press down the stop-lever *d*, push the axial pin through the aperture in the recoil-shield, where the said axial pin will engage with the locking-pin, thus preventing the hammer from being raised, and the stop-lever *d*, dropping into and engaging with the annular recess *e* on the axial pin, will prevent said pin from moving forward. By raising the stop-lever and pulling the axial pin forward the hammer is unlocked. A spring-face may be secured on the rear end of the axial pin, and the locking-pin on the hammer-shaft be made fixed. It is necessary that either the locking-pin or the face of the rear end of the axial pin be movable, in order that if the axial pin be pushed back when the hammer is raised, when the hammer is thrown down in the act of firing the arm it will not be prevented from doing so, but that the locking-pin will pass over the rear end of the axial pin.

I claim—

1. In a revolver fire-arm, a locking device connected with the hammer, whereby, in combination with the axial pin of the cylinder, the hammer may be locked and unlocked, as described.

2. The combination of the axial pin A, provided with the annular notches *e e′*, the stop-lever *d*, and the locking-pin C, on the hammer B, as and for the purpose described.

Witness my hand this 8th day of September, 1875.

CHAS. W. HOPKINS.

Witnesses:
LEWIS A. HYDE,
H. W. TIBBITS.